United States Patent [19]

Klein

[11] E Re. 29,889

[45] Reissued Jan. 30, 1979

[54] CROWN REMOVER

[76] Inventor: Michael B. Klein, 730 5th Ave., New York, N.Y. 10019

[21] Appl. No.: 630,059

[22] Filed: Nov. 7, 1975

Related U.S. Patent Documents

Reissue of:

[64] Patent No.: 3,834,026
Issued: Sep. 10, 1974
Appl. No.: 344,801
Filed: Mar. 26, 1973

[51] Int. Cl.[2] ..... A61C 3/16
[52] U.S. Cl. ..... 32/43
[58] Field of Search ..... 32/43, 41, 62, 68

[56] References Cited

U.S. PATENT DOCUMENTS

| | | | |
|---|---|---|---|
| 1,111,603 | 9/1914 | Mertes | 32/68 |
| 2,674,800 | 4/1954 | Osborn et al. | 32/62 |

*Primary Examiner*—Robert Peshock

[57] ABSTRACT

An improvement in a dental crown removing pliers having a pair of opposed arm members pivotally connected to define on one side of the pivot a pair of opposed jaws which improvement resides in a resilient deformable gripping surface on the surface of said jaws generally contoured to coincide with a side surface of a crown, said resilient deformable gripping surface adapted to hold at least one jaw of said pliers against the surface of a crown; a method of removing a crown by gripping the same in the jaws of a dental crown removing pliers which has on a surface of at least one jaw a resilient deformable gripping surface.

18 Claims, 7 Drawing Figures

CROWN REMOVER

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

This invention relates to a dental pliers of a type employed to remove a dental crown. More particularly, this invention is directed to a dental pliers which can grip a dental crown in the jaws thereof which pliers facilitate the removal of the dental crown without impairment to the crown or to the supporting structure. This especially applies to the removal of porcelain fused to gold crowns where the porcelain covering can easily be damaged.

DISCUSSION OF THE PRIOR ART

Dental crowns have been removed through use of tools which generally have a pair of opposed jaws. Presently, the most widely accepted crown remover is in the form of a pliers, the jaws of which are inwardly to terminate in pointed surfaces. The dental crown removers are generally in the form of pincers having a pair of handles and two grasping jaws working on a pivot. The jaws terminate at their inwardmost extremity to define a point or ridge.

They are used by opening the jaws and placing the same at the middle of the crown to be removed. The ridge of the jaws engages the middle portion of the crown. The crown is then lifted away from the tooth pivot point while a slight rocking motion of the pliers is employed. The crown is therefore removed towards the center of the mouth. Unfortunately, these devices all too often damage either the crown or the supporting structure, owing to the fact that they concentrate the force on a narrow area of the crown or bridge and have pointed ends.

It has now become desirable to provide a dental crown remover which distributes the forces required over a broad area. It has been desirable to provide a dental crown removing pliers which grips a broad area of the surface of the crown to be removed and facilitates removal of the crown or bridge intact without physical damage thereto. More especially, it has become desirable to provide dental pliers which do not have sharp pointed ends which can damage the porcelain fused to gold crowns.

SUMMARY OF THE INVENTION

Broadly, this invention contemplates an improvement in a dental crown removing pliers having a pair of opposed arm members pivotally connected to define on one side of the pivot a pair of opposed jaws, said improvement comprising a resilient deformable gripping surface on at least one jaw, the surface of said jaw generally contoured to coincide with a portion of a side surface of a crown, said resilient deformable gripping surface adapted to hold at least one jaw of said pliers against the surface of a crown.

In a particularly desirable embodiment, each jaw of the dental crown removing pliers has a surface which is generally contoured to coincide with opposite sides of a crown. Each surface having thereon a resilient deformable surface, such as one made of natural or synthetic rubber. In an especially desirable embodiment, at least one of the surfaces and preferably both of the surfaces are provided with inwardly directing fingers or nipples made of natural or synthetic rubber, said fingers or nipples themselves being yieldable and deformable to the contour of the single crown or crowns of the bridge to be removed.

As stated above, the jaws of the dental pliers are generally contoured at least on the surface to coincide with a side surface of the crown. By this is meant that at least 50% of its surface will engage the crown. Preferably, it is so dimensioned that 95% of its area is in contact with the crown to be removed. Each jaw surface generally engages an area of at least 25% of the side of the crown to be removed. Thus, when a pair of jaws are engaged around a dental crown, at least about 20% preferably 20 to 60% of the side surface of the crown is held in gripping relationship with the jaws of the dental pliers. Suitably, the surface of each jaw can have an area between 0.25 and 1 square centimeter. Normally, the dental pliers will have at each jaw a concave gripping surface, as more fully described below. Thus, the pliers has a pair of opposed concave jaws, the surfaces of which contain a resilient deformable gripping surface.

The resilient deformable gripping surface is suitably made of a natural or synthetic rubber which serves to give a positive gripping action for the jaws of the pliers around the crown. Thus, the crown is held by the pliers tightly thereto which permits the crown to be readily removed without damage thereto or to its supporting structure. By use of a resilient deformable gripping surface, the minor crevices and crags on the side of the tooth are gripped so that virtually the entire area of the crown within the overall dimension of the jaw is in positive contact with the surface of the jaws which facilitates removal of the crown.

BRIEF DESCRIPTION OF THE DRAWINGS

The invention can be more readily understood and appreciated by reference to the accompanying drawings which include a drawing of a prior art crown remover. Referring to the drawings.

DESCRIPTION OF THE SPECIFIC EMBODIMENT

Figure 1:
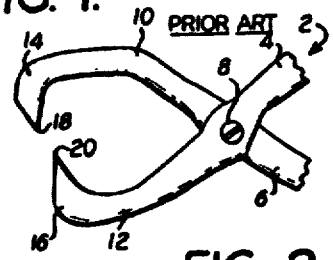
FIG. 1 is a side elevation of a portion of a prior art crown remover having an overall pincer shape.

Before discussing the invention illustrated in FIGS. 2–6 inclusive, it is believed helpful to briefly discuss the prior art crown remover of FIG. 1. The prior art crown remover (2) has a pair of opposed arm members 4 and 6 pivotally connected at 8. On one side of the pivot, there are defined a pair of opposed jaws 10 and 12 which are inwardly at 14 and 16 and terminate in slightly rearwardly directed points or pair of points 18 and 20. These points form a ridge running along the width of the crown remover. This ridge engages the crown and the supporting structure and the rearwardly directed ridge helps to remove the crown by exerting a force against the middle thereof towards the center of the mouth. Unfortunately, damage to a porcelain fused to gold crown would take place with its use.

The crown remover of the present invention has a pair of opposed arm members, 22 and 24, which can suitably have a convex shape, so as to readily conform to the human hand. These opposed arm members are connected at a pivot point 26 and forwardly thereof define a pair of jaws 28 and 30, each of which has an opposed jaw surface, 32 and 34, at one end thereof.

Figure 2:
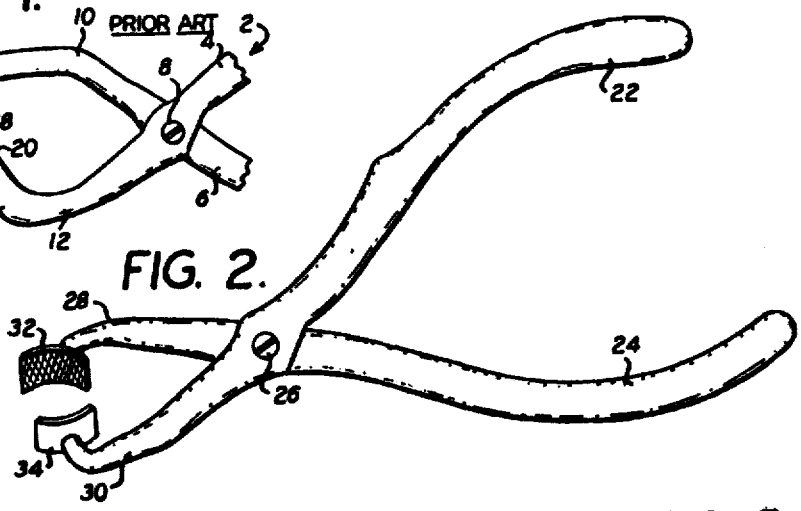
FIG. 2 is a side elevation of a crown remover of the present invention.
Figure 4:
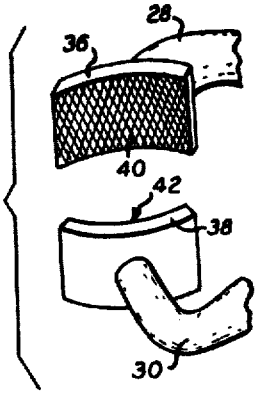
FIG. 4 is an enlarged view of a portion of FIG. 1, that portion encircled showing the jaws and the resilient deformable surface thereon.

As seen in FIG. 4, which is an enlargement of the jaw area of pliers of FIG. 2, the dental pliers of the present invention have jaw members 36 and 38 which support resilient deformable gripping surfaces 40 and 42. These gripping surfaces are made of a material such as a rubber or synthetic rubber. They can be slightly porous to inwardly absorb any moisture which might be on the surface of the crown to thereby ensure that moisture travels inwardly and does not lessen the bond between the gripping surfaces 40 and 42, and the surface of the crown to be removed.

Figure 6:
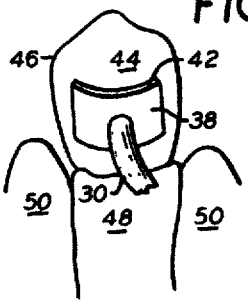

Referring to FIG. 6, the pliers is opened and the surfaces 40 and 42 engage a side surface 44 of a crown positioned over a crown understructure, 48, within the gum area 50. When the jaws engage the side surface of the crown, the rubber or other deformable gripping surface can enter any of the minor cavities, crags or crevices on the surface of the crown to grip the same so that a large percentage of the area of the gripping surfaces 40 and 42 is in contact with the crown side surface 44. The removal of the crown is done by moving the pliers upwardly or downwardly, depending upon whether the crown is on the upper or lower jaw, and with a slight rocking motion to loosen it.

Figure 3:
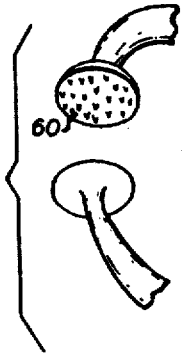
FIG. 3 is an isometric view of an embodiment of the invention.

Another embodiment of the present invention is shown in FIG. 3 which depicts a pair of jaws, each of which is rounded and provided with a surface 60 of a deformable gripping material. The size and shape of the sufrace 60 will depend upon the contour of the crown, which is to be engaged by the gripping surfaces of the pliers.

Figure 5:
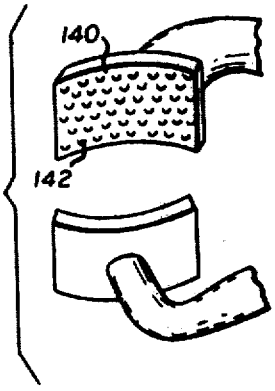
FIG. 5 is a view similar to FIG. 4 showing a different type of gripping surface on the surface of the jaws of the dental pliers.

A particularly preferred embodiment is shown in FIG. 5 where it is seen that the gripping surface comprises a number of inwardly directed gripping means such as suction cups, cuts, grooves,fingers or nipples. Generally speaking, at least 50% of the surface 140 of the gripping surface has inwardly directed gripping fingers 142. These gripping fingers or nipples further assist in the engagement on the side of the crown in filling any minor irregularities on the surface thereof and in providing a possible contact between the crown remover and the crown.

The above generally reflects the nature of the invention. It is apparent that modifications can be made. For instance, the surface of the jaws which is in contact with the side of the crown can be made of a number of different materials other than natural or synthetic rubber. They can be porous as well as non-porous. They can even have an adhesive thereon, especially adhesives which are inert to the material of the crown. Similarly, the overall shape of the jaws of the pliers can vary from the specifically shown concave arcuate form to forms wherein each surface is flat. Moreover, the surface of the crown remover can be shaped to provide a plurality of concavities or a concave surface can be disposed next to a flat or convex surface. Means can be provided on the members, 28 and 30, to lock the same together after the jaws have become in engagement with the side of the crown so that a lengthening of the inwardly directed force against the crown does not occur during the removal operation itself.

Accordingly, it should be understood that the terms and expressions herein have been used for the purposes of illustration and not of limitation, as there is no intention, in the use of such terms and expressions, of excluding any equivalents or portions thereof, as various modifications and departures from the above may be obvious to one of skill in the art.

It should also be recognized that a smaller version of the same resilient deformable gripping surface can be applied to existing crown removers or other plier type instruments. This would be in the form of an attachment.

Figure 7:
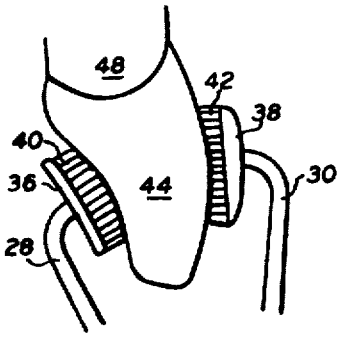
FIGS. 6 and 7 show the manner in which the pliers are employed to engage the side surface of the crown.

It should also be noted that the instrument should be slightly varied when using it on anterior teth. To facilitate a better grip on the anterior teeth, the instruments lingual gripping surface should be convex while its labial surface remains concave (FIG. 7). The relationship of the handle to the gripping jaws is also varied in that the gripping head is perpendicular rather than parallel to the axis of the instrument's body and handle.

What is claimed is:

1. In a dental crown removing pliers, having a pair of opposed arm members pivotally connected to define on one side of the pivot a pair of opposed jaws, the improvement which comprises a resilient deformable gripping surface on at least one jaw, the surface of said jaw generally contoured to coincide with a side surface of a crown or bridge, said resilient deformable gripping surface adapted to hold at least one jaw of said pliers against a portion of the side surface of a crown, the surface of said jaw being made of a porous material which absorbs water.

2. An improvement according to claim 1, wherein the surface contains inwardly directed gripping fingers or nipples which are deformable.

3. An improvement according to claim 2, wherein the jaws of the pliers comprise a pair of opposed concave jaw members.

4. Improvement, according to claim 2, wherein said resilient deformable gripping surface is of natural or synthetic rubber.

5. An improvement according to claim 2, wherein the combined area of the surfaces of the jaws of the pliers are at least 20 percent of the area of the side of the crown to be removed.

6. An improvement according to claim 2, wherein at least 50 percent of the surface of the jaw contains gripping fingers.

7. An improvement according to claim 2, wherein both of the opposed jaws are rounded and have a roughened rubber surface.

8. An improvement according to claim 2, wherein the surface of both jaws is made of a resilient deformable gripping surface.

9. A method for removing a dental crown which comprises gripping the crown within the jaws of the dental pliers of claim 2 and applying a force to said crown away from its substrate whereby to separate said crown from said tooth.

10. An improvement according to claim 1, wherein one jaw is provided with a convex-shaped gripping surface and the opposed jaw is provided with a concave-shaped gripping surface.

*11. In a dental instrument for grasping a dental crown and the like which has a shape and surface similar to a tooth:*

*(a) a scissors comprising a pair of movable members each having a tip opposed to and spaced from the other,*

*(b) manually operated scissors handles on the respective members on said instrument for moving the tips of said members towards or away from each other selectively to grasp or release a crown and the like therebetween,*

*(c) and a small cushioned and contoured pad affixed to each tip in opposed relationship on said tips, said pads being shaped to fit the opposite exterior of a crown and the like, whereby a dental crown and the like may be grasped by pressure on said handles from the hands causing said movable members to close said pads on said crown and the like and be held in place during fitting and cementing.*

*12. In a dental instrument for grasping a dental crown and the like which has a shape and surface similar to a tooth:*

*(a) a hand member comprising a pair of movable members each having a tip opposed to and spaced from the other,*

*(b) manually operated hand member handles on the respective movable members on said instrument for moving the tips of said movable members towards or away from each other selectively to grasp or release a crown and the like therebetween,*

*(c) and a cushioned and contoured pad affixed to each tip in opposed relationship on said tips, said pads being shaped to fit the opposite exterior of a crown and the like, whereby a dental crown and the like may be grasped by pressure on said handles from the hands causing said movable members to close said pads on said crown and the like and be held in place during fitting and cementing.*

*13. The device claimed in claim 12 wherein portions of each member is inclined upwardly so that the tips of the instrument incline upwardly.*

*14. The device in claim 12 wherein said pads are curved and have a cushioned face thereon.*

*15. The device in claim 12 wherein there is a latching means for the members.*

*16. The device claimed in claim 12 wherein the tips of said members are curved outwardly and thence inwardly thereby creating an upwardly extending pair of opposed tips defining a space in which a crown is clamped.*

*17. The device in claim 12 wherein said instrument is a scissors having the handles on each movable member which are opened and closed by manipulating the members, said members being inclined at the tips and curved outwardly and thence inwardly.*

*18. In a dental crown removing pliers, having a pair of opposed arm members pivotally connected to define on one side of the pivot a pair of opposed jaws, the improvement which comprises a resiliently deformable gripping surface on at least one jaw, the surface of said jaw generally contoured to coincide with a side surface of a crown or bridge, said resilient deformable gripping surface adapted to hold at least one jaw of said pliers against a portion of the side surface of a crown, the surface of said jaw being made of a cushioned and contoured pad.*

* * * * *